F. E. TAYLOR.
POSITIVE GEAR TRANSMISSION.
APPLICATION FILED SEPT. 7, 1917.

1,320,658.

Patented Nov. 4, 1919.
4 SHEETS—SHEET 1.

Inventor
F.E.Taylor
By
P. C. Bryant
Attorney

F. E. TAYLOR.
POSITIVE GEAR TRANSMISSION.
APPLICATION FILED SEPT. 7, 1917.

1,320,658.

Patented Nov. 4, 1919.
4 SHEETS—SHEET 2.

Inventor
F. E. Taylor
By T. R. Bryant
Attorney

F. E. TAYLOR.
POSITIVE GEAR TRANSMISSION.
APPLICATION FILED SEPT. 7, 1917.
1,320,658.
Patented Nov. 4, 1919.
4 SHEETS—SHEET 3.
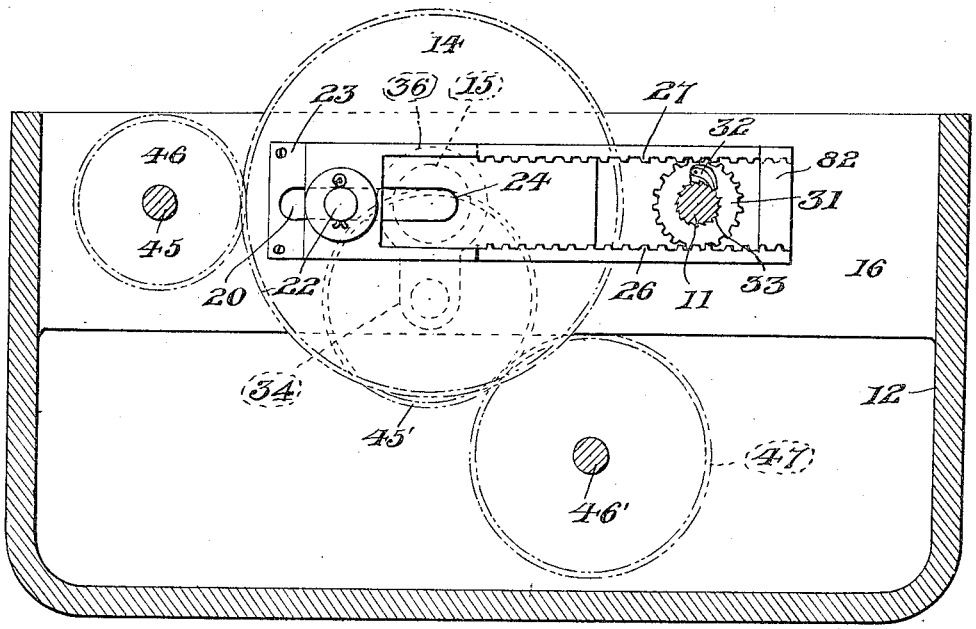
FIG. 4.
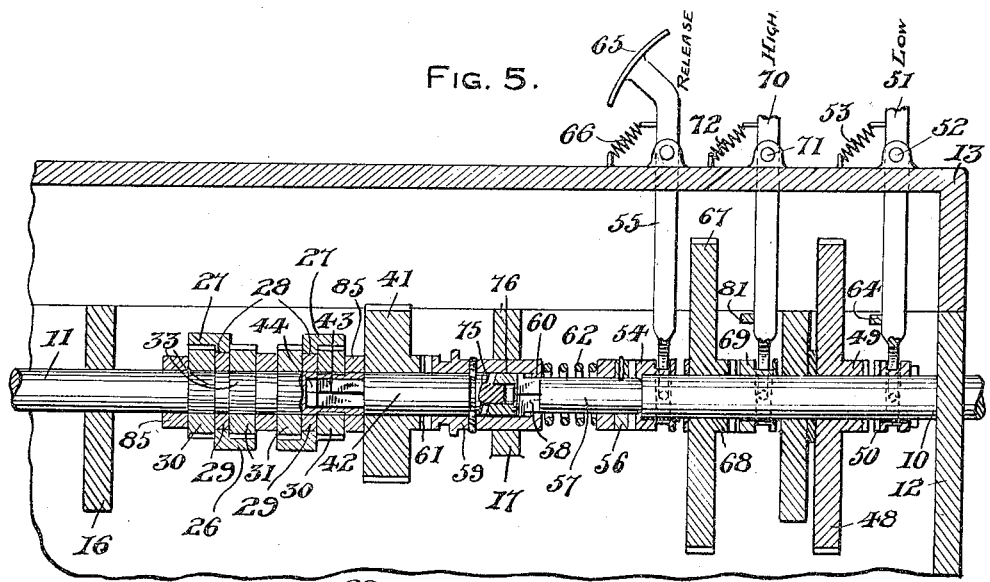
FIG. 5.
FIG. 13.
Inventor
F. E. Taylor
By T. K. Bryant,
Attorney F. E. TAYLOR.
POSITIVE GEAR TRANSMISSION.
APPLICATION FILED SEPT. 7, 1917.
1,320,658.
Patented Nov. 4, 1919.
4 SHEETS—SHEET 4.
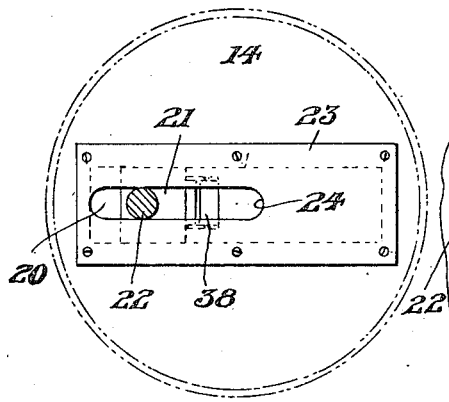
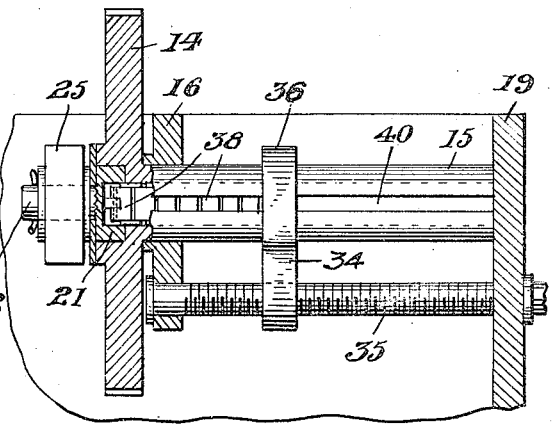
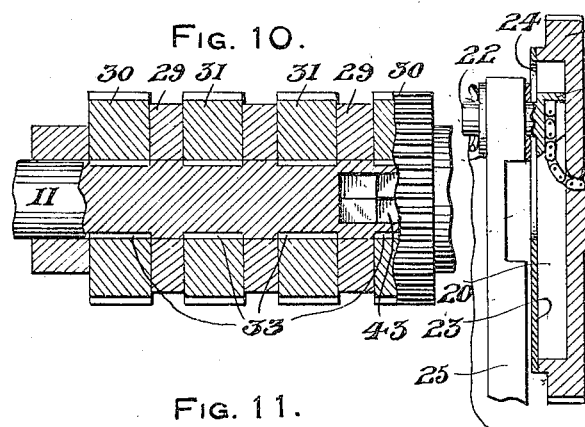
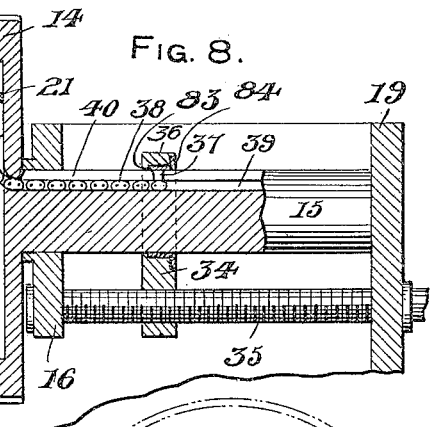
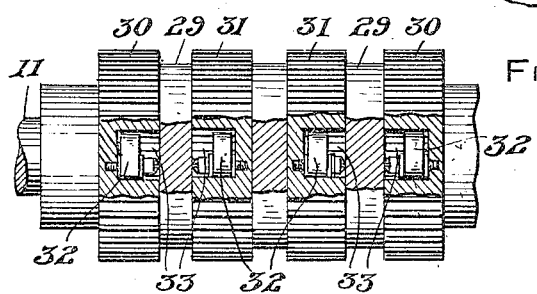
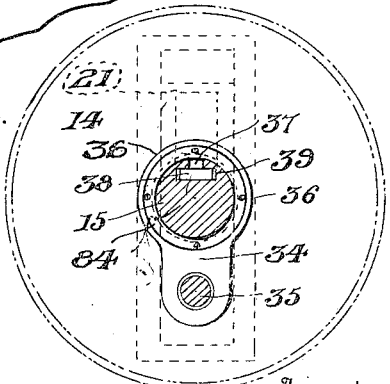
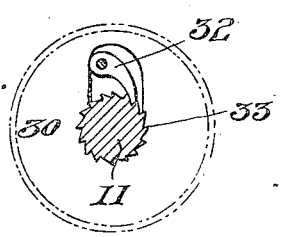
Inventor
F. E. Taylor
By T. R. Bryant
Attorney

UNITED STATES PATENT OFFICE.

FERNANDO E. TAYLOR, OF OSBORNE, KANSAS.

POSITIVE GEAR TRANSMISSION.

1,320,658.         Specification of Letters Patent.         Patented Nov. 4, 1919.

Application filed September 7, 1917. Serial No. 190,179.

*To all whom it may concern:*

Be it known that I, FERNANDO E. TAYLOR, a citizen of the United States of America, residing at Osborne, in the county of Osborne and State of Kansas, have invented certain new and useful Improvements in Positive Gear Transmission, of which the following is a specification.

This invention relates to new and useful improvements in positive gear transmission.

The primary object of the invention is a provision of a transmission gear mechanism especially adapted for automobiles and all machines driven by gas explosions whereby an unusually large number of speeds is provided under the control of the operator without the requirement of shifting any gears.

A further object of the device is a provision of a gear transmission that possesses great strength and possesses all of the advantages of the friction or disk transmission and employs gears that are constantly in mesh, the transmission being readily operable either by means of a lever, pedal or electrical controlling device.

In carrying out these and other objects of the invention which will hereinafter appear it will be seen from the description of the device in connection with the accompanying drawings that whenever it is desired to increase the speed of the vehicle or driven shaft, the high speed lever is operated which gradually increases the speed to the maximum, which is engine speed, and that upon releasing the said lever, the speed will continue constant at such point but upon the continued operation of such lever, the change speed mechanism will be automatically rendered inoperative upon acquiring the engine or the highest speed. The low speed lever may then be operated for diminishing the speed until the dead center or neutral point is reached, resulting in no speed, while the release of the low-speed lever at any intermediate point permits the continuity of movement at such speed.

In the drawings forming a part of this application and in which like reference characters designate corresponding parts throughout the several views, Figure 1 is a top plan view of the device illustrated as changing the speed by means of the high-speed mechanism.

Fig. 4 is a similar view taken upon line IV—IV of Fig. 1.

Fig. 5 is a central longitudinal sectional view taken through the main driving shaft, with the cover or cap arranged upon the gear casing.

Fig. 6 is a detail vertical sectional view taken adjacent one of the track shafts.

Fig. 7 is an end elevation thereof.

Fig. 8 is a view similar to Fig. 6 with portions shown in central longitudinal section.

Fig. 9 is a vertical transverse sectional view thereof.

Fig. 10 is an enlarged longitudinal sectional view of the portion of the main shaft and the ratchet gears for driving the same.

Fig. 11 is an elevational view thereof partially broken away illustrating the pawls.

Fig. 12 is a transverse sectional view of the same, and

Fig. 13 illustrates a different form of driving connection between the gears and driven shaft of the device.

Figure 1:
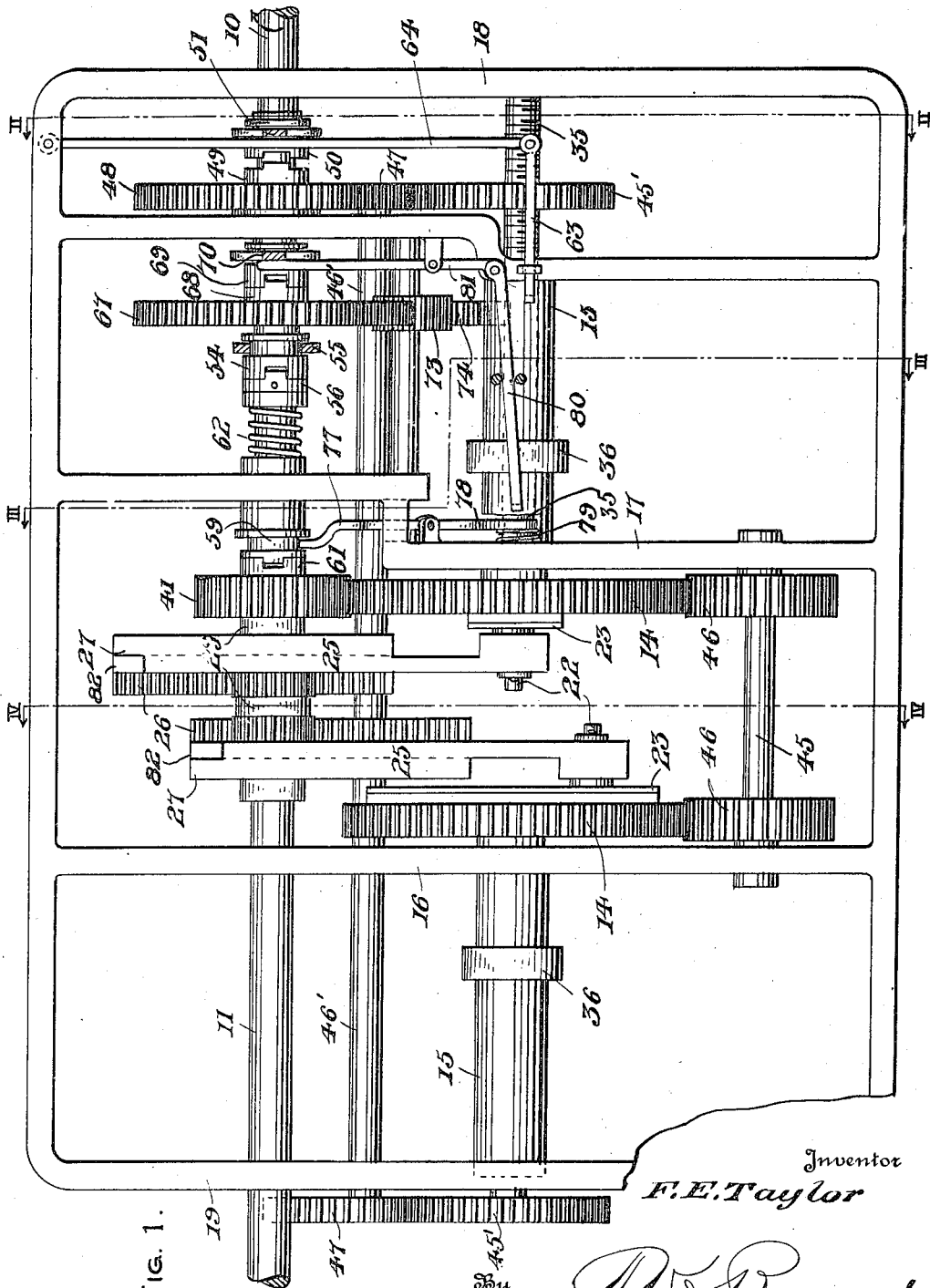
Figure 2:
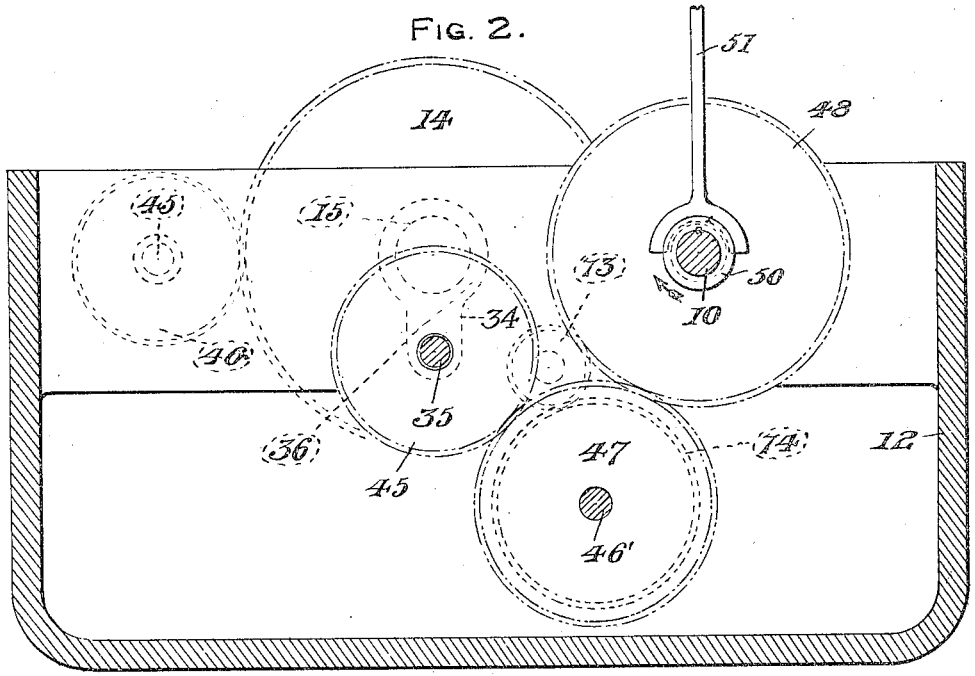
Fig. 2 is a vertical transverse sectional view taken upon line II—II of Fig. 1.
Figure 3:
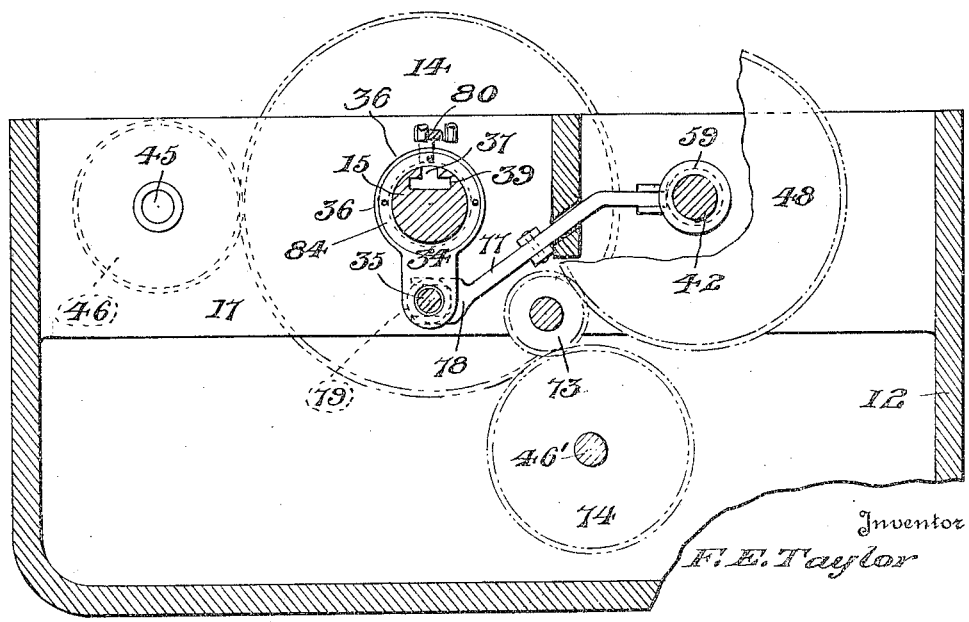
Fig. 3 is a similar view taken upon line III—III of Fig. 1.

Referring more in detail to the drawings, it will be understood that the device is designed for changing the speed between the engine shaft 10 and the driven shaft 11, of such constructions as that found in automobiles and all machines driven by gas explosions where it is especially desirable to effect different changes in speed between the shaft of the motor and the differential driving shaft. A casing 12 is provided for the mechanism, preferably having a cover-plate or a cap 13.

Similar gears 14 are arranged in the casing 12 having journaling axles 15, herein termed "track shafts" and projecting through spaced partitions 16 and 17 and journaled therein, extending in opposite directions toward the front and rear ends 18 and 19 respectively of the casing. The gears 14 are provided with guideways 20 upon their inner adjacent faces, extending radially of the gears, transversely of the mounting shafts 15 thereof. A block 21 is arranged within each of the guideways 20 having a pin 22 projecting from the same while a plate 23 arranged over each guideway 20 has one of the pins 22 slidably positioned within a slot 24 of the plate, which retains the block in position and limits its inward movement at the center of the carrying gear.

A pitman 25 is journaled at one end upon one of the said pins 22 and being of rectangular form is arranged around the driven shaft 11 while an inwardly projecting rack 26 is provided upon the bottom of each pitman 25 and an outwardly projecting rack 27 is provided at the top of each pitman. It will be understood that the teeth of the said racks 26 and 27 extend toward the shaft 11, upon the opposite sides of which shaft the said racks are arranged, while longitudinal ribs 28 are arranged upon the opposite sides of each pitman for bearing upon spacing collars 29 secured to the shaft 11. The ribs 28 serve as guiding means for the pitmen 25 and move between gears 30 and 31 and may be spaced from the collars 29 or ride thereon, as herein shown. A removable end 82 is provided for each pitman 25 facilitating the assembling of the device.

The ratchet gears 30 and 31 are arranged upon the shaft 11 for driving the same at different speeds, each pair of said gears having one of the spacing collars 29 positioned therebetween so that the bottom rack 26 of each pitman 25 is in constant mesh with one of the gears 31, while the top rack 27 of each pitman is in constant mesh with one of the end gears 30. Pivoted pawls 32 of any desired number are carried by the gears 30 and 31 engaging toothed surfaces 33 provided upon the shaft 11 inwardly of the gears. Any desirable form of clutching engagement members may be arranged between the gears 30 and 31 and the shaft 11 it being essential that the operation thereof be as herein illustrated, that the movement of a pitman 25 in either direction will exert a turning impulse upon the shaft 11 by means of one of the gears 30 and 31, while the other rack of the same pitman will permit its gear to freely ratchet over the adjacent shaft portion 33. Fig. 13 illustrates another form thereof.

With one of the pins 22 positioned outwardly of the center of its respective gear 14, it will be understood that such pitman 25 will be reciprocated, thereby operating the gears 30 and 31 in opposite directions which are in mesh with such pitman and consequently revolving the shaft 11 in a uniform direction during each longitudinal movement of the pitman. It will be evident that when the pin 22 is positioned centrally of its gear 14 and axially of its shaft 11, such pin will be upon a dead center and no reciprocations will be imparted to the pitman 25, while longer reciprocations will be imparted to the pitman as its pivot pin 22 is moved radially outwardly of its gear 14 within the guideway 20 and that the greatest throw of the pitman and consequently the greatest speed imparted to the shaft 11 by the gear 14 will take place when the pin 22 is at the outer end of the guideway 20.

A shift block 34 is threaded upon a screw or worm 35 journaled beneath each shaft 15, while a collar portion 36 of the block is slidably positioned upon the adjacent shaft 15.

A ring 83 slidable upon the shaft 15 is journaled within the collar portion 36, being retained by a plate 84, and is provided with an inwardly extending finger 37 attached to the outer end of a transmission chain 38, which is slidably arranged within a trackway 39 communicating with the guideway 20, the inner end of the chain 38 being secured to the block 21. The turning of the worms 35 for feeding the blocks 34 inwardly toward the gears 14 forces the pins 22 outwardly for increasing the speed of the device, while the turning of the worms 35 in the opposite direction feeds the blocks 34 outwardly and the pins 22 toward the center of the gears 14 thereby reducing the speed of the device. A slot 40 is provided in each shaft 15 for communicating with the chain track 39 thereof and through which slot the fingers 37 extend. A transmission gear 41 is journaled upon a transmission portion of shaft 42 adjacent the forwardmost ratchet gear 30, the said shaft portion 42 being slidably connected to the inner end of the driven shaft 11 by means of a squared end 43 of the portion 42 which is slidably arranged within a squared socket 44 at the forward end of the shaft 11. Fixed washers 85 are arranged upon the shaft 11 outwardly of the gears 30.

The transmission gear 41 is in constant mesh with the forward one of said gears 14. An idler shaft 45 is journaled between the partitions 16 and 17 having idler pinions 46 secured thereon in constant mesh with the two gears 14 and whereby as will be evident, the turning of the transmission gear 41 will turn the two gears 14 in a direction opposite to that of the transmission gear. A similar gear 45' is carried by each of the worms 35 and a longitudinal shaft 46' is journaled through the casing 19 with a gear 47 at each end thereof in mesh with the gears 45' so that by turning the shaft 46' in one direction, the blocks 34 will be moved outwardly simultaneously and upon turning the shaft 46' in the opposite direction, the said blocks 34 will be simultaneously shifted inward toward each other.

A low-speed gear 48 is journaled upon the shaft 10 in constant mesh with the adjacent gear 47 and arranged with a clutch hub 49 adapted for engagement by a clutch member 50 slidably splined upon the shaft 10 and operable by a forked lever 51 pivoted to the cover-plate 13 as at 52 and arranged with a spring 53 for normally maintaining the clutch members 49 and 50 disengaged. With the blocks 34 in an intermediate position and the device at an intermediate speed as herein illustrated, a forward pressure upon the upper end of the clutch lever 51, closes the clutch members 49, 50 so that the gear 48 turns with the motor shaft 10 for turning the adjacent gear 47 and gears 45' so that the shaft 46' is turned by the gear 48 in the proper direction to move the blocks 34 outwardly away from the gears 14, shifting the pins 22 inwardly toward the centers of the gears 14 and thereby reducing the speed of the shaft 11, it being understood that the transmission gear 41 is being turned, simultaneously with the changing of the speed, whenever the transmission clutch 54 is in mesh as controlled by the release forked lever 55 thereof.

The clutch 54 is slidably splined upon the rear end of the motor-shaft 10 adapted for clutching engagement with a clutch collar 56 secured to a connecting portion 57 of the main shaft. The forward end of the shaft portion 57 abuts against the rear end of the motor shaft 10 while its rear end is squared as at 58 for receiving a clutch sleeve 59 having a squared opening 60 slidably arranged upon the squared portion 58. The sleeve 59 is normally maintained in clutching engagement with the hub 61 of the transmission gear 41 by means of an encircling spring 62 carried by the connecting shaft portion 57 adjacent the sleeve 56 and whereby as will be evident, the turning of the motor shaft 10 turns the shaft 57 when the clutch 54 is in mesh and when the clutch 61 is also in mesh, the turning of the driven shaft 11 is unaffected thereby, excepting by means of the pitmen 25 which act to turn the shaft 11 at any different speeds not to exceed that of the shaft 10 and gear 41.

As heretofore noted, the lever 51 may be operated to lower the speed which is transmitted between the gear 41 and the shaft 11 and upon releasing the lever 51 at any time, the blocks 34 will remain stationary with the pins 22 adjusted for a certain speed of the shaft 11. When the pins 22 arrive substantially at the dead center of the gears 14, the forward block 34 will engage an arm 63 pivoted to a lever 64 which engages the inner side of the clutch lever 51 and automatically releases the clutching members 49 and 50. From this description will be understood the manner in which the speed of the shaft 11 is reduced any desired degree by means of the clutch lever 51.

The driven shaft 11 may be disconnected from the motor-shaft 10 whenever desired by releasing the foot pedal 65 of the clutch lever 55, it being understood that a spring 66 normally tends to hold the clutch 54, 56 out of engagement. The pressure of the foot upon the pedal 65 closes the transmission clutch and any usual form of retaining means may be provided therefor if desired. This transmission clutch may be arranged normally closed if desired and adapted to open by means of the pedal 65.

A high-speed changing gear 67 is journaled upon the shaft 10 arranged with a clutching hub 68 coöperating with a clutch member 69 splined upon the shaft 10 and having an operating lever 70 pivoted as at 71 to the cover 13 and having a spring 72 for normally maintaining the clutch members 68, 69 out of engagement. The gear 67 is in constant mesh with an idler pinion 73 which is in mesh with a gear 74 upon the longitudinal shaft 46' and whereby the turning of the gear 67 will revolve the shaft 46' in a direction opposite to that imparted to the shaft 46' by the gear 48. By forcing the upper end of the lever 70 forwardly against the action of a spring 72, the clutch 68, 69 is engaged and the gear 67 turned by means of the shaft 10, thereby revolving the shaft 46' and the worms 35 in the direction for inwardly moving the blocks 34 toward the gears 14 and moving the pins 22 radially outwardly upon the gears 14 and increasing the throw of the pitmen 25 and increasing the speed of the shaft 11 when revolved by the gear 41 when the transmission clutch 54, 56 is in its operative engagement.

The forward end of the transmission shaft portion 42 is provided with a clutch portion 75 adapted for engagement with a clutch portion 76 of the rear end of the connecting shaft portion 57, when the sleeve 59 is moved forwardly disengaging the sleeve 59 from the clutching hub 61 of the transmission gear 41. A clutch lever 77 is provided for the sleeve 59 having one end 78 in the form of a fork spanning the adjacent worm 35 and arranged for engagement by the adjacent block 34 upon the said worm, while a cushioning spring 79 is arranged upon the worm between the said block and lever end 78.

When the blocks 34 are moved inwardly as occasioned by forcing the upper portion of the lever 70 forwardly, the forward block 34 will engage the spring 79 and force the lever end 78 toward the partition 17 thereby forwardly moving the sleeve 59 and disengaging the same from the transmission gear 41. This forward movement of the sleeve 59 as will be noted is automatically accomplished when the blocks 34 have moved the pins 22 to the highest possible speed of the pitmen 25 and such movement of the sleeve 59 at this time engages the clutch portions 75 and 76 whereby the transmission shaft portion 42 is turned with the connecting portion 57 which moves at engine speed with the motor-shaft 10 whenever the transmission clutch 54, 56 is operatively engaged. At such time, and at all times, the shaft 11 will be turned at the same speed as the transmission shaft portion 42 so that the driven shaft 11 will be turned at engine speed whenever the portion 42 is revolved and which only takes place when it is clutched up with the shaft portion 57 and this occurs only when the sleeve 59 is retracted in its forward position. At such high-speed position of the blocks 34, the forward one of said blocks will engage a bar 80 which is pivoted to a lever 81 engaging the high-speed clutch lever 70, so that when the highest speed is reached, the clutch members 68, 69 will be automatically disengaged as the driven shaft 11 will then be clutched to the motor shaft 10 and driven at engine speed which is the highest speed attainable by the device.

The complete operation of the device will be understood from this detailed description of its construction and the operation of its parts, it being seen that any desirable intermediate speed is readily attainable from high to low or low to high by the easy manipulation of pedals by the operator while the change-speed mechanism is automatically disconnected upon arriving at either high or low speed. The transmission gear by means of the pedal 65 at all times controls the operative connection between the motor and the driven shaft 11 and it will be understood that reversing gears may be employed if desired and in which event all of the change-speeds will be employed therewith.

The advantages and effect of a sliding disk transmission are included in a positive gear transmission and while the present form of the invention is believed to be preferable, it will be understood that minor changes may be made therein without departing from the spirit and scope of the invention as hereinafter claimed.

By releasing the clutch 65, the transmission gears 67 and 48 will operate slides 36, changing position of pins 22, while the gears 41 and 14 remain passive. Thus, if the engine be "killed" at high speed, the pins 22 can be returned to dead center.

When the clutch 54—56 is closed the shaft 11 will be in motion, while the speed of shaft 11 may be changed simultaneously with its operation by a manipulation of either of the levers 51 or 70. The pins 22 of the pitmen 26 move uniformly as the blocks 34 are uniformly driven so that said pins will always be spaced the same distance from the peripheries of the gears 14, so as to impart the same speed to the shaft 11. The pitmen may move outwardly and inwardly together or in opposite directions or one following shortly after the other depending upon the relative planes at which the guideways 20 are positioned when the gears 14 are assembled.

The pitmen 25 may be operatively connected to the shaft 11 as shown in Fig. 13 and in which spring pressed dogs 86 are positioned within sockets 87 of the ratchet gears 30 and 31 journaled upon the shaft 11. The dogs 86 are oppositely positioned and travel over recessed toothed portions 88 in the opposite faces of the intermediate spacing ring 29, which is fixed to the shaft 11. The racks of the pitmen being in mesh with the gears 30 and 31 operatively drive the said gears which impart rotary movement to the spacing ring 29 and the shaft 11, this form of action being in the nature of a dog clutch and it being understood that the teeth of the portions 88 and the engaging ends of the dogs 86 are inclined or beveled in the usual manner of dog and teeth ratchet means.

What I claim as new is:—

1. A speed change device comprising a driving shaft and a driven shaft, a pair of simultaneously operable driving gears, a slidable change speed operative connection between each of said driving gears and said driven shaft including a pitman, operative connections between said driving gears, and operative connections between the driving shaft and one of said driving gears.

2. A speed change device comprising a driving shaft and a driven shaft, a plurality of simultaneously operable driving gears, a plurality of reciprocating pitmen having ratcheting operative engagement with the driven shaft on both directions of their reciprocating movement, slidable speed changing connections between said pitmen and said driving gears, and operative connections between the driving shaft and one of said driving gears.

3. A speed change device comprising a driving and a driven shaft, simultaneously operable driving gears, reciprocating pitmen having ratcheting operative engagement with the driven shaft, slidable speed changing connections between the said pitmen and gears, a connecting shaft portion adapted for clutching engagement with the driving shaft, a transmission gear in constant mesh with one of the said driving gears and clutch connections between the connecting shaft portion and said transmission gear normally in operative engagement when the device is arranged at intermeditae speeds and automatically disengaged when the device is arranged at high speed and direct connections between the driven shaft and said connecting shaft portion automatically engageable upon the attainment of high speed connections during the operation of the device 4. Speed change mechanism comprising a driving and driven shaft, operatively connected driving gears, ratchet gears upon the driven shaft, rectangular shaped pitmen having toothed opposite sides in constant mesh with the said ratchet gears adapted for revolving the driven shaft in a uniform direction during the reciprocation of the pitmen, pivot blocks for the adjacent ends of the pitmen radially slidably carried by said gears and controllable operative connections between the said gears and driving shaft.

5. A speed change mechanism comprising a driving and driven shaft, operatively connected driving gears, ratchet gears upon the driven shaft, rectangular-shaped pitmen having toothed opposite sides in constant mesh with the said ratchet gears adapted for revolving the driven shaft in a uniform direction during the reciprocation of the pitmen, pivot blocks for the adjacent ends of the pitmen radially slidably carried by said gears, chains attached to the said blocks adapted for adjusting the latter in either direction radially of the gears, simultaneously operable moving means attached to the opposite ends of the chains, direction changing operative connections between the driving shaft and the said moving means and driving connections between the driving shaft and said gears adapted to be automatically disconnected upon the outward limit of movement of the said pivot blocks with the device in its high speed arrangement.

6. A device of the class described comprising a driving and a driven shaft, a transmission shaft section slidably keyed to said driven shaft in axial alinement therewith, a transmission gear journaled upon said transmission section, speed changing operative connections between said gear and driven shaft, a connecting shaft portion between the driving shaft and transmission shaft portion, clutch connections between the connecting shaft portion and the driving shaft, a clutch sleeve slidably keyed upon said connecting shaft portion and longitudinally movable with the said transmission shaft portion, arranged in clutching engagement between the connecting shaft portion and the said gear during the operation of the device in other than its high speed arrangement, clutch connections between the adjacent ends of said transmission and connecting shaft portions adapted for operative engagement upon the automatic disengagement of the said sleeve and gear when said speed change connections are positioned at their maximum speed, whereby a direct driving connection is effected between the said driving and driven shafts.

7. A speed changing device comprising, in combination, a driving shaft and a driven shaft, means to gradually vary the speed connections between said shafts including an adjustable double-rack-carrying pitman and a pair of spur gears, each having a ratchet connection with the driven shaft and meshing with one rack of said pitman, and automatically controlled direct driving connections between said shafts.

8. A speed changing device comprising, in combination, a driving shaft and a driven shaft, means to gradually vary the speed connections between said shafts including a pair of adjustable double-rack-carrying pitmen and four spur gears, each having a ratchet connection with the driven shaft and meshing with one rack of one of said pitmen, and automatically controlled direct driving connections between said shafts.

In testimony whereof I affix my signature.

FERNANDO E. TAYLOR.

Copies of this patent may be obtained for five cents each, by addressing the "Commissioner of Patents, Washington, D. C."